UNITED STATES PATENT OFFICE.

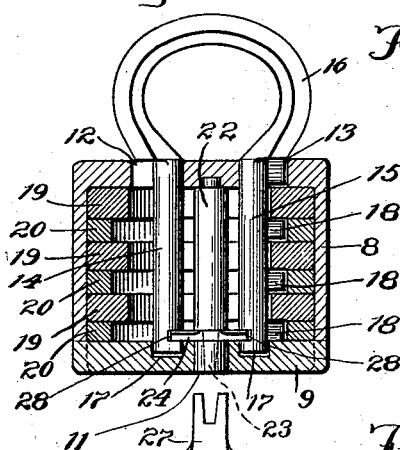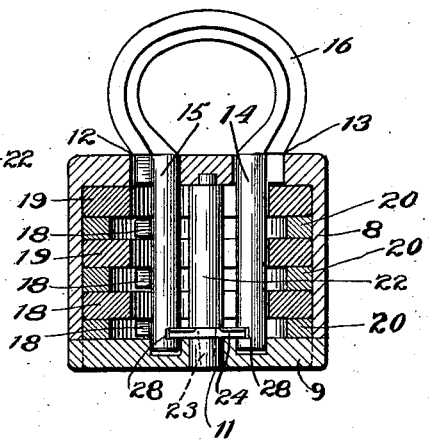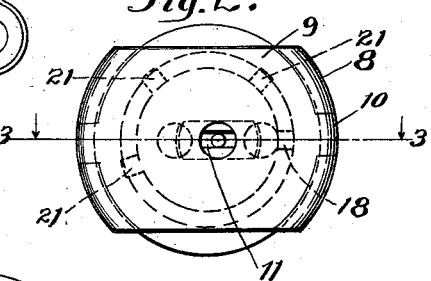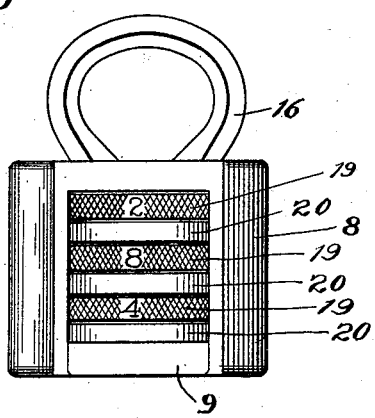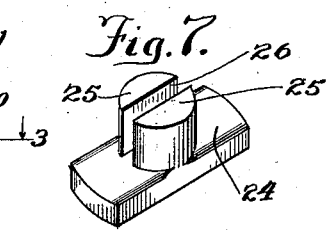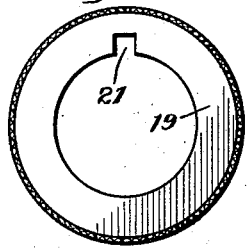

PETER WAYDA, OF AURORA, ILLINOIS.

PERMUTATION-PADLOCK.

1,001,104.   Specification of Letters Patent.   Patented Aug. 22, 1911.

Application filed March 17, 1911. Serial No. 615,073.

*To all whom it may concern:*

Be it known that I, PETER WAYDA, a subject of the King of Hungary, residing at Aurora, in the county of Kane and State of Illinois, have invented certain new and useful Improvements in Permutation-Padlocks, of which the following is a specification, reference being had to the accompanying drawings.

My invention relates to padlocks, and has for its object to provide a new and improved combined permutation and key padlock of such construction that the lock may be effected either by the use of the permutation rings alone, or by the use of a key-operated lock alone, or by both the key-operated mechanism and the permutation rings together. I accomplish this object as illustrated in the drawings and as hereinafter described.

What I regard as new is set forth in the claims.

In the accompanying drawings,—Figure 1 is a side elevation of my padlock; Fig. 2 is a bottom view thereof; Fig. 3 is a vertical section on line 3—3 of Fig. 2 showing the arrangement of the parts when both the permutation rings and the key-operated mechanism are used, or the permutation mechanism is used alone; Fig. 4 is a similar view showing the arrangement when the key-operated mechanism alone is used; Fig. 5 is a plan view of one of the permutation rings; Fig. 6 is a side view of the pin which carries the key-operated bolt; and Fig. 7 is a perspective view of the key-operated bolt.

Referring to the drawings,— 8—9 indicate the members of the frame or casing which supports the several parts of the padlock, the member 8 being a U-shaped frame and the member 9 a plate which fits across the open end of the member 8 and is permanently secured thereto after the parts of the lock have been assembled. As best shown in Fig. 2, for this purpose the plate 9 is provided at its opposite ends with tongues 10 which fit in suitable recesses provided on the ends of the member 8 so that the parts fit closely together and may be permanently secured by brazing or other suitable means. The plate 9 is provided approximately at its center with an aperture 11 for the passage of the head of the key-operated bolt, as hereinafter described. The intermediate portion of the member 8, which lies opposite the member 9, is provided with apertures 12—13 to receive the shanks 14—15 of a shackle 16, as shown in Figs. 3 and 4, and opposite said orifices the member or plate 9 is provided with recesses 17 which receive the ends of the shanks 14—15, as shown in said figures. Thus the shanks of the shackle are firmly supported against lateral movement and are held rigidly in position. One of the shanks, as 15, is provided with a series of laterally-projecting lugs 18 arranged at intervals throughout its length, as shown in Figs. 3 and 4, which coöperate with permutation rings 19 to lock the shackle in position. The rings 19 are spaced apart by spacer rings 20 which lie opposite the several lugs 18, as shown in Figs. 3 and 4, and are of greater internal diameter than the permutation rings 19, the latter being of such diameter that when the parts are in the position shown in Fig. 3 they overlie the lugs 18 and thereby may operate to prevent the withdrawal of the shackle. The several permutation rings 19 are each provided with a single notch 21 of suitable width to receive the lugs 18 so that when the several notches 21 are brought into alinement with each other and with the lugs 18 the shackle may be withdrawn, but not otherwise.

As best shown in Fig. 4, the orifices 12—13 are so placed that the shackle is a little to one side of the axis of the frame of the lock, so that when it is turned half way around from the position shown in Fig. 3, so that the lugs 18 project at the left-hand side instead of at the right-hand side, the permutation rings 19 do not overlie said lugs and consequently do not operate to lock the shackle in place. The purpose of this arrangement is to render the permutation rings inoperative so that the key-operated mechanism hereinafter described may be employed alone.

22 indicates a pin, the inner end of which is fitted in the transverse portion of the member 8, its outer end being provided with a projecting pivot 23 which extends through the orifice 11 in the plate 9, as shown by dotted lines in Fig. 4.

24 indicates a key-operated bolt in the form of a cross-head, which fits upon the pivot 23 and is provided with a boss 25 which is journaled in the orifice 11 so that the bolt is held properly in position but is left free to rotate. The boss 25 is provided with a slot 26, as shown in Fig. 7, said slot being provided for the admission of a key 27. The ends of the bolt 24 project into laterally-disposed notches 28 provided near the ends of the shanks 14—15 so that when the bolt is turned to the position shown in Figs. 3 and 4 its ends fit in said notches and lock the shackle against removal, independently of the position of the permutation rings.

It will be apparent that with the parts in the position shown in Fig. 3 the shackle will be locked in position by the permutation rings and also by the bolt 24, and that even if the permutation rings were turned so as to bring their notches 21 into alinement with the lugs 18, the shackle would still be locked by the bolt 24; also that if the bolt 24 be moved out of engagement with the shackle without the notches 21 having been brought into alinement with the lugs 18 the permutation rings would lock the shackle in position. Thus the arrangement shown in Fig. 3 operates both by means of the permutation rings and by the key-operated mechanism to lock the shackle against removal.

With the parts arranged as shown in Fig. 4, the permutation rings are inoperative as the lugs 18 do not project beyond them, and therefore the key-operated mechanism alone controls the removal of the shackle.

It will be understood, of course, that the permutation rings are suitably numbered or lettered so that the proper position for unlocking the shackle may be known.

That which I claim as my invention, and desire to secure by Letters Patent, is,—

1. A padlock, comprising a frame, permutation rings mounted therein, a shackle having shanks projecting into said frame, one of said shanks having means adapted to interlock with said permutation rings, a rotary bolt in said frame adapted to engage said shackle to lock the same in the frame, and means whereby said bolt may be turned into or out of operative position.

2. A padlock, comprising a frame, permutation rings mounted therein, a shackle having shanks projecting into said frame, one of said shanks having means adapted to interlock with said permutation rings, and a rotary bolt in said frame adapted to engage said shackle to lock the same in the frame, said bolt having a boss fitted in an orifice in the frame.

3. A padlock, comprising a frame, an axially-disposed pin mounted therein, permutation rings mounted in said frame, a shackle having shanks projecting into said frame, one of said shanks being arranged to coöperate with said permutation rings for locking the shackle in position, and a bolt pivotally mounted upon said pin and movable into and out of locking engagement with said shackle.

PETER WAYDA.

Witnesses:
K. SCHMIDT,
A. HOLDEN.

Copies of this patent may be obtained for five cents each, by addressing the "Commissioner of Patents, Washington, D. C."